Nov. 20, 1956     C. A. LAYSTROM     2,771,259
WALL MIRROR MOUNTING
Filed April 10, 1952
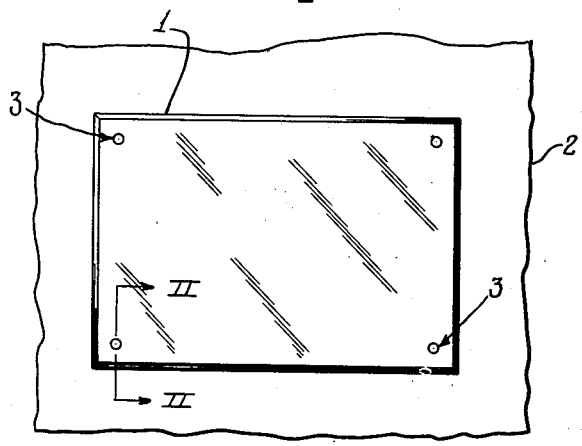
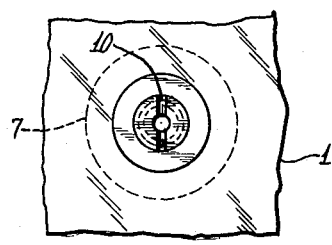
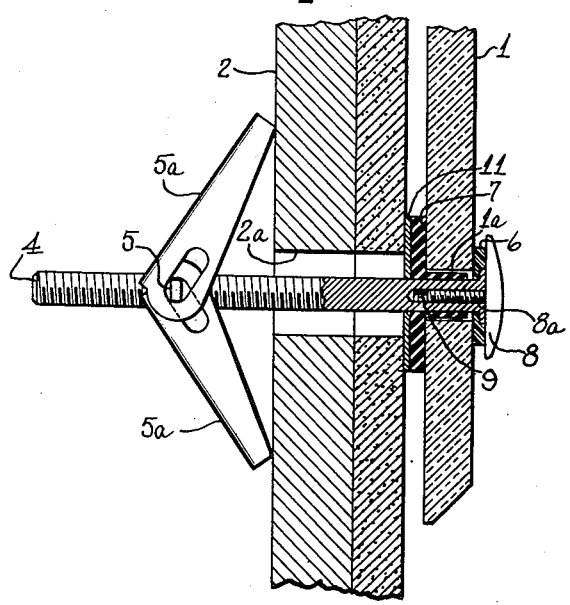
Inventor
CARL A. LAYSTROM
by Hill, Sherman, Meroni, Gross & Simpson
Attys.

United States Patent Office 2,771,259
Patented Nov. 20, 1956

2,771,259

WALL MIRROR MOUNTING

Carl A. Laystrom, Decatur, Ill., assignor to Faries Manufacturing Company, Decatur, Ill., a corporation of Illinois Application April 10, 1952, Serial No. 281,568

2 Claims. (Cl. 248—28)

This invention relates to fastening mechanism for use with objects to be attached to vertical support surfaces such as walls.

More specifically the invention relates to a fastening device designed to allow the fastening of mirrors or other glass plates to wall surfaces directly without danger of breaking the mirror or glass at the point where the fastening device projects through it.

One of the major problems involved with the hanging of wall mirrors has been the breakage of the mirror around the fastener at the time of installation. Where the mirror is intended to be hung directly on the wall without a frame, it is necessary to drill holes in the glass itself and pass fastening mechanism through the holes into the wall. In order to allow for rapid installation, and the use of conventional pass-through fastener bolts and to allow slight adjustment at the time of hanging, it has been the custom to drill a larger hole in the wall than the hole in the mirror. This allows the above desired results but has a serious disadvantage in that it leaves the area immediately surrounding the hole in the window or mirror entirely unsupported. This lack of support coupled with the fact that glass is extremely brittle has led to a large number of glass failures at that point. A further shortcoming in the prior art technique has been that no provision has been made for uneven wall surfaces. Since it is very often found that the wall upon which a mirror or other glass is to be mounted is not an exactly plane surface, mounting of the glass has in the past required that one or more corners of the glass be left somewhat loose, or otherwise to be under an unusually large strain which in many cases may cause breakage.

It is, therefore, an object of this invention to provide a novel fastener wherein the force applied to the glass during installation is minimized and cushioned.

A further object of my invention is to provide a simple yet effective fastening device for use with mirrors whereby the load imposed upon the mirror at the fastener is absorbed by the fastener.

Yet another object of my invention is to provide a fastening device which allows the installation of plate glass mirrors on walls having irregularities therein, without unduly straining the mirror.

Another object of my invention is to provide a decorative, resilient wall mounting for mirrors that effectively reduces the danger of mirror breakage due to vibration of the supporting wall or irregularities therein.

Many other features and advantages and additional objects of the present invention will become apparent to those versed in the art upon reference to the details and description which follows in the accompanying sheet of drawings in which a preferred structural embodiment incorporating the principles of the present invention is shown by way of illustrative example.

On the drawings:

Figure 1 is a view of a mirror suspended on a wall by means of four of the novel fasteners of my invention;

Figure 2 is an enlarged partially sectional view of one of my novel fasteners taken along the line II—II of Figure 1;

Figure 3 is an end view of the fastening device suspending a mirror, but without the decorative bezel in place; and Figure 4 is a view of my novel weight distributing washer, shown in Figure 2.

As shown on the drawings:

A particularly desirable use of my invention is in the fastening of large plate glass mirrors to the ordinary plaster household wall. In Figure 1 such a plate glass mirror 1 is shown fastened to the usual wall 2 by means of four fasteners generally indicated at 3. Each of the fasteners 3 comprises the threaded bolt 4 which is passed through the aperture 1a of the mirror and 2a of the wall. A well known crosshead toggle arrangement is provided at 5 for allowing the threaded bolt 4 to firmly grip the wall. A circular washer 7 is provided between the wall 2 and the mirror 1. This washer has an upstanding tubular section 7a joined with a flat disk-like portion 7b. While the washer 7 is preferably constructed of rubber, it is contemplated that any resilient material may be used. A decorative bezel 8 is attached to the bolt 4 by means of a tapped hole 9 which cooperates with threads 8a to maintain the bezel in place over the bolt 4 and aperture 1a.

In order to prevent the head of the bolt 4 from impinging on the glass of the mirror, I provide a cupped washer 6. This washer is preferably constructed of a plastic material. However, it is contemplated that any material having semi-rigid properties, but which will yield under medium loads, may be used.

In use, the crosshead 5, with its appended arms 5a is removed from the shaft 4. The washer 6 is placed on the bolt and the bolt is then placed through the opening 1a in the mirror and the washer 7 is placed on the bolt 4. The crosshead 5 with the arms 5a is then placed on the bolt 4 and the whole passed through the aperture 2a until the arms 5a, which are normally spring biased in an outward direction, pass the wall 2 and spread out forming a reaction member which will not return through the opening. The bolt 4 is then rotated by means of a screw driver operating in the slot 10 until the mirror is tightened down against the resilient washer 7 to a point where no looseness remains. As a final step the bezel 8 with its threaded portion 8a is fastened to the bolt 4 in the tapped aperture 9.

It will be noted from an inspection of Figure 2 that the resilient washer 7b forms a spacer which holds the mirror 1 a slight distance away from wall 2. This fact, along with the resiliency of the material and the support given by the tubular portion 7a of the washer 7 all contribute to prevent any glass-to-metal contact, with resultant stresses, from being set up in the mirror.

It may be desirable in some installations, where heavy duty characteristics are desired, to provide a metal disk 11 similar to the flange 7b having an inside diameter smaller than the outside diameter of the hole 2a such that it would take the bending force about the edge of the opening 2a, thus protecting the corners of the aperture 1a from damage by pressure applied by the bolt 4. This metal disk may be separate from the rubber washer 7, or may, if desired, be bonded to it.

It is recognized that in some installations, some of the fasteners may lie over wood or other material in which an ordinary wood screw may be used. In such cases, I contemplate using a screw in place of the bolt 4. The screw would in that case be identical to the bolt 4 except that it would have tapered threads rather than the toggle arrangement.

From the foregoing description it will be seen that I have provided a novel and valuable article of manufacture for use in the hanging of mirrors and other similar glass articles. It will, of course, be understood that modifications and variations may be effected without departing from the scope of the novel concept of the present invention.

I claim as my invention:

1. In combination with a flat article and a support, a fastening device for retaining said article on said support comprising in combination a headed and threaded fastening member, a flanged, tubular, resilient rubber-like washer mounted on said member, the tubular portion of said washer extending along said member toward its head away from the flange thereof and within an aperture formed in the article to be fastened by the member, the flange of said washer extending radially outwardly from said fastening member between the article to be fastened and the support whereby upon tightening of the member into said support the article to be fastened will be forced by the head of the member against said washer thereby distributing the stresses impressed by the head of the member upon the article evenly over the flange of the washer, and a second cupped washer of semi-rigid plastic material positioned between the head of said member and the article to be fastened, said cupped washer acting to yieldingly distribute loads from said head to said article whereby said washers resiliently maintain said article isolated relative to said member and said supports and whereby substantial tightening loads may be applied by the head of said member without injury to said article.

2. The structure recited in claim 1 wherein said support has an aperture therein substantially larger than the diameter of said member, wherein said member projects through said support and has means securing the member to said support, and wherein a rigid generally circular washer is positioned on said member between said flanged washer and said support and completely overlapping the aperture in said support to provide a supporting area for said flange of said resilient washer.

References Cited in the file of this patent

UNITED STATES PATENTS

| | | |
|---|---|---|
| 911,568 | Bickford | Feb. 9, 1909 |
| 1,728,874 | Masury | Sept. 17, 1929 |
| 1,795,308 | La Hodny | Mar. 10, 1931 |
| 1,814,502 | Barwood | July 14, 1931 |
| 1,908,831 | Edward | May 16, 1933 |
| 2,092,509 | Hampton et al. | Sept. 7, 1937 |
| 2,632,620 | Hurley | Mar. 24, 1953 |

FOREIGN PATENTS

| | | |
|---|---|---|
| 453,048 | Germany | Nov. 26, 1927 |
| 794,921 | France | Dec. 26, 1935 |